Sept. 24, 1957
T. G. CHARLES
2,807,720
REGULATED OSCILLATOR
Filed March 25, 1953
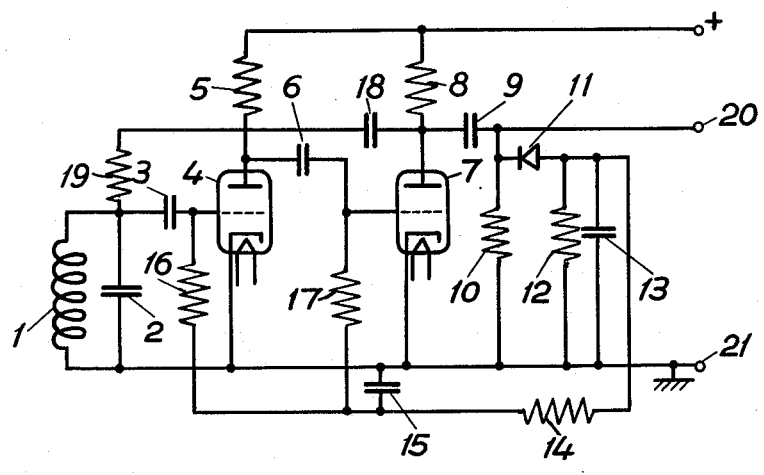
Inventor
THOMAS G. CHARLES
By [signature]
Attorney.

United States Patent Office 2,807,720
Patented Sept. 24, 1957

2,807,720

REGULATED OSCILLATOR

Thomas G. Charles, Vasteras, Sweden, assignor to Allmanna Svenska Elektriska Aktiebolaget, Vasteras, Sweden, a Swedish corporation Application March 25, 1953, Serial No. 344,620

Claims priority, application Sweden January 12, 1953

3 Claims. (Cl. 250—36)

The object of the present invention is a device for indication or measurement of a transient change in the magnification factor (Q-factor) of an oscillatory circuit which is connected to the input of an amplifier, the output voltage of which is fed back to the input with appropriate phase to maintain oscillation.

Another object of the invention is the provision of a device for detecting the presence of impurities, for instance of conducting material in a non-conducting base material, or a material, the dielectric losses of which differ from those of an insulating base material. The influence of the material upon an oscillatory circuit consisting of a coil and a parallel connected capacitor is utilized for this purpose. In the first case the material may be passed through the coil of the oscillatory circuit, in the latter case between the plates of the capacitor.

The main feature of the invention is that the gain of the amplifier is arranged to be automatically regulated by a direct voltage derived from the output voltage of the amplifier by means giving a time delay which is at least of the same magnitude as the duration of the transient changes to be measured.

In the accompanying drawing, which diagrammatically shows one form of a device according to the invention, 1 designates a coil and 2 a capacitor which is connected in parallel with the coil 1 so that the abovementioned oscillatory circuit is formed. The latter is connected through a capacitor 3 to the grid of a vacuum triode 4, the plate voltage of which is applied through a resistor 5. The plate of the vacuum tube 4 is connected through a capacitor 6 to the grid of a further vacuum triode 7, the plate of which is connected through a resistor 8 to the positive terminal of a grounded voltage source. The plate of the last-mentioned tube 7 is connected through a capacitor 9 to a resistor 10 and a half-wave rectifier 11 followed by a resistor 12 and a capacitor 13, the voltage across which is applied through resistors 16 and 17 to the grids of the triodes through a time delaying means consisting of a resistor 14 and a capacitor 15. The plate of the triode 7 is further connected to the grid of the first triode 4 through a capacitor 18 and a resistor 19. The terminals 20 and 21 are connected to a means for measurement or detection of transient changes in the voltage between said terminals.

By passing the material to be examined through the coil 1 or between the plates in the capacitor 2, a transient change of the magnification factor of the oscillatory circuit is obtained if the material contains impurities or inhomogeneities. The oscillatory circuit and the amplifier are as shown in the drawing connected to form an oscillator. The connection shown fulfills the requirement that the feedback voltage shall have the same phase as the input voltage to the amplifier. The gain of the amplifier is controlled by means of a direct voltage obtained by rectification of the output voltage of the oscillator. In this way the oscillations may be maintained at such a reduced amplitude that the amplifier will work within that portion of its characteristic which may be regarded as linear. The automatic gain controlling voltage is provided by the half-wave rectifier 11 and the combination of the resistor 12 and the capacitor 13 and is applied to the grids of both triodes through the delaying means consisting of the resistor 14 and the capacitor 15. The total gain of the amplifier plus the feedback loop will thus normally be maintained equal to unity, but a transient change in the magnification factor of the oscillatory circuit will produce a transient change in the amplitude of oscillation. The transient changes in the magnification factor caused by impurities or inhomogeneities in the material passing the oscillatory circuit thus cause corresponding transient changes in the amplitude of oscillation, so that the impurities or inhomogeneities may be perceived by any well-known means responsive to transient changes in the voltage between the terminals 20 and 21. In order to make the sensitivity to transient changes in the magnification factor as large as possible, the gain of the amplifier is made large while the feedback ratio of the oscillator is made small by a voltage division determined by the ratio between a fixed resistor 19 and the resonance impedance of the oscillatory circuit, which is equivalent to an ohmic resistance, so that the attenuation in the voltage divider is equal to the normal voltage amplification in the amplifier.

In principle it would be possible to obtain the time delay in the gain regulating circuit solely by increasing the time constant of the RC-combination 12, 13, but in practice this is unsuitable for several reasons. One of these reasons is that the load of the output stage 7 would be very large when the magnification factor of the oscillatory circuit changes and the half-wave rectifier 11 might be damaged when it was dimensioned for optimum efficiency. Another reason is that this concentration of the time delay to the smoothing elements 12, 13 would give different time constants for increasing and decreasing amplitude of oscillation.

If, however, according to the invention, the time delay is produced by means of a special RC-circuit 14, 15, the members of the smoothing circuit 12, 13 can be dimensioned optimally.

The form shown should only be regarded as illustrative, and several modifications are possible within the scope of the invention. It is thus not necessary that the oscillator comprises two stages of amplification, but it should always be provided with time-delayed amplitude regulating means.

I claim as my invention:

1. In a means for examining a substance, including an oscillator having a resonant circuit arranged to produce an electromagnetic field in the substance under test whereby variations in characteristics of said substance in said field tend to vary the amplitude of the oscillation of said resonant circuit, amplitude-stabilizing feedback means for said oscillator counteracting a decrease as well as an increase in said amplitude for compensating for said variations in amplitude, and time-delay means in said feedback means for permitting transient variations in said amplitude to prevail without compensation for brief intervals.

2. In a means as claimed in claim 1, said oscillator comprising a substantially linear amplifier having gain controlling elements responsive to a direct voltage, said amplitude-stabilizing feedback means comprising means for deriving a direct voltage from said amplitude of oscillation and feeding said direct voltage to said gain controlling elements and said time-delay means being in said last feeding means.

3. In a means as claimed in claim 2, said time-delay means being a low-pass filter comprising a series resistor and a shunt capacitor.

References Cited in the file of this patent

UNITED STATES PATENTS

| | | |
|---|---|---|
| 2,268,872 | Hewlett | Jan. 6, 1942 |
| 2,379,694 | Edson | July 3, 1945 |
| 2,394,018 | Shank et al. | Feb. 5, 1946 |
| 2,424,972 | Dubin | Aug. 5, 1947 |
| 2,442,138 | Mann et al. | May 25, 1948 |
| 2,447,248 | Harris | Aug. 17, 1948 |
| 2,523,051 | Norgaard | Sept. 19, 1950 |
| 2,580,670 | Gilbert | Jan. 1, 1952 |

FOREIGN PATENTS

| | | |
|---|---|---|
| 645,084 | Great Britain | Oct. 25, 1950 |